Figure 1:
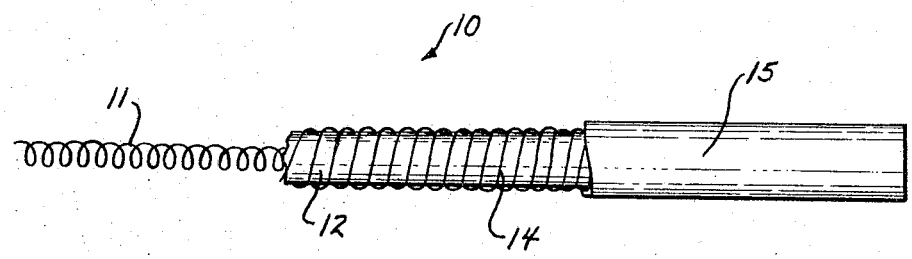

Jan. 17, 1967

C. S. THOMPSON 3,299,375

ELASTIC STRETCHABLE COAXIAL CABLE HAVING
CONSTANT CAPACITANCE USING WOVEN OR
HELICALLY WOUND CONDUCTORS
Original Filed Dec. 5, 1960

INVENTOR.
CHARLES S. THOMPSON
BY
Lockwood Woodard Smith & Weikart
Attorneys

United States Patent Office 3,299,375
Patented Jan. 17, 1967

3,299,375
ELASTIC STRETCHABLE COAXIAL CABLE HAVING CONSTANT CAPACITANCE USING WOVEN OR HELICALLY WOUND CONDUCTORS
Charles S. Thompson, Fort Wayne, Ind., assignor to The Magnavox Company, Fort Wayne, Ind., a corporation
Continuation of application Ser. No. 291,192 June 27, 1963, which is a continuation of application Ser. No. 73,917, Dec. 5, 1960. This application Sept. 22, 1965, Ser. No. 496,230
4 Claims. (Cl. 333—96)

This application is a continuation of my copending application, Serial No. 291,192, filed June 27, 1963, now abandoned, which is a continuation of my application, Serial No. 73,917, filed December 5, 1960, now abandoned.

The present invention relates generally to an elastic coaxial cable, and more particularly to the design of an extensible elastic coaxial cable having invariant capacitance and resistance with elongation.

As is known, the elastic suspension system typically used, for example, in connection with a sonobuoy hydrophone includes a solid rubber cord and a two-conductor insulated electrical communication cable tied thereto at specific intervals, where the numerous ties resulted in an expensive assembly operation requiring highly trained workers. Early attempts to utilize a coaxial cable in the aforementioned application proved unsuccessful in that stretching of the coaxial cable resulted in altered cable capacitance due principally to the change in diameters of the inner and outer conductors of the cable. Such variation of capacitance with stretching was deemed responsible for a spurious signal and contributed to an unwanted noise level, notwithstanding the fact that some degree of control of the capacitance variation was possible by changing, for example, the radii of the inner and outer conductors and/or the pitch distance of the windings.

By virtue of the instant invention, the applicant has devised new and novel formulae for obtaining an elastic coaxial cable having the desired constant capacitance and resistance during elongation, where the investigation leading towards such formulae included a study of the physical laws to determine the characteristics of an extensible elastic coaxial cable, as well as the performance characteristics of a manufactured cable possessing certain properties such as low intrinsic capacitance, imperviousness to water, minimum size, long shelf life, the desired elastic coefficient, and the capability of reaching a given ultimate elongation before rupture. All of the aforesaid factors were considered in regard to coaxial cables having either a winding where the conductors are wound side by side on a cylinder of a given diameter in the form of parallel helices, referred to as helical conductors, or where the conductors are cross-woven in braided configuration, referred to as woven conductors.

Accordingly, a principal object of the present invention is to provide a new and novel extensible elastic coaxial cable having an invariant capacitance and resistance with elongation.

Another object of the present invention is to provide a new and novel extensible electric coaxial cable capable of maintaining electrical continuity during elongation.

A further object of the present invention is to provide new and novel mathematical formulate, as defined by complex equations, for selecting the proper design characteristics required for different types of extensible elastic coaxial cables which have an invariant capacitance during elongation and retraction.

A still further object of the present invention is to provide new and novel mathematical formulae for selecting the desired design characteristics of an extensible elastic coaxial cable having either helical or woven conductors.

Figure 2:
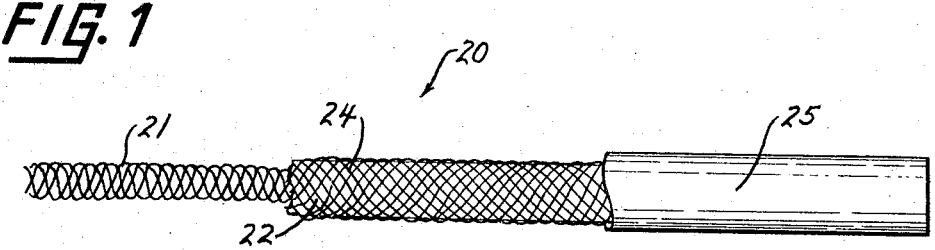
Figure 3:
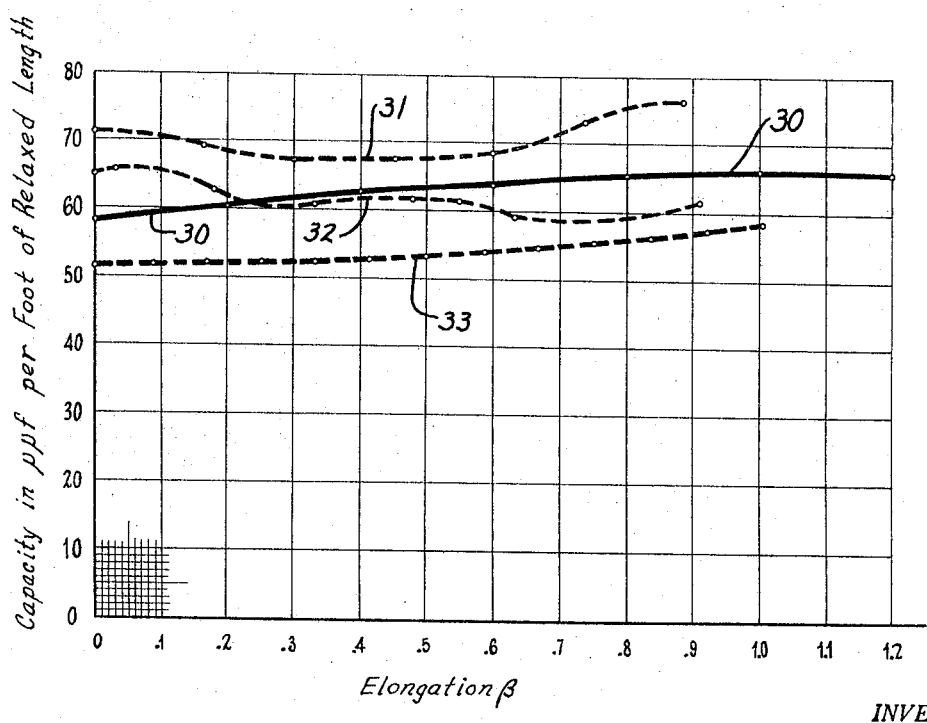

Other objects and a better understanding of the present invention will become more apparent from the following description, taken in conjunction with the accompanying drawings, wherein FIG. 1 is a plan view, partly broken away, showing an extensible elastic coaxial cable having helical conductors;

FIG. 2 is a plan view, partly broken away, of an extensible elastic coaxial cable having woven conductors; and, FIG. 3 is a curve sheet whereon capacitance calculated from the new and novel equation developed for a coaxial cable having helical conductors is plotted against elongation and compared with measured capacitance, also plotted against elongation, for cables manufactured in accordance with the design formulation.

For the purposes of promotion an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated devices, and such further applications of the principles of the inventon as illustrated therein being contemplated as would normally occur to one skilled in the art to which the invention relates.

In the development of the new and novel formulae of the instant invention, various approaches were undertaken to determine what choice of design factors was necessary to produce a cable which would be invariant in capacitance as the cable experienced elongation and retraction. One approach was to fabricate and test cables of various dimensions, but it soon became apparent that in order to produce a cable having the desired relationship of cable capacitance to elongation factor $\beta$, many designs would have to be fabricated, with no real assurance of arriving at a useful solution.

Such experimental procedure, however, made it apparent that more factors contribute to the control of cable capacitance than the basic influence of conductor diameter and pitch distance. For example, the opening and closing of the space between wires of the inner and outer conductors were one of such factors, while other contributing factors for ultimate capacitance included the radius of the outside conductor in relaxed state; the radius of the inside conductor in relaxed state; the pitch distance of one turn of wire of outside conductor; the pitch distance of one turn of wire of inside conductor; the number of wires wound in parallel in the outside conductor; the number of wires wound in parallel in the inside conductor (if different from the outside conductor); the dielectric constant of the intermediate jacket; the coefficient of elongation; and, the diameter of the insulated wire. It should be noted that the expression "relaxed state" as used throughout the application refers to the "original" relaxed state of the cable as the point of reference, inasmuch as after stretching, a cable does not quite return to its original state.

Upon finding that the experimental approach would be undesirable in the design of an extensible elastic coaxial cable capable of meeting any preconceived requirement, a theoretical approach was initiated to develop a set of formulae and curves capable of predicting the design factors necessary to achieve the desired invariant cable capacitance. Simultaneous experimental work was started to show corroboration of the design principles which evolved during the progress of mathematical development.

The aforementioned theoretical or mathematical approach was separately carried out for coaxial cables having both helical conductors and woven conductors.

In regard to the latter, and particularly with reference to FIG. 1, in accordance with the instant invention, an extensible elastic coaxial cable 10 having helical conductors comprises an inner conductor 11 made of wire in the form of continuous parallel helices, an inner insulating jacket 12 covering the inner conductor 11, an outer conductor 14, also in the form of wire made in continuous parallel helices, and an outer insulating jacket 15 covering the outer conductor 14. Generally similar, and with particular reference to FIG. 2, and also in accordance with the instant invention, an extensible coaxial cable 20 having woven conductors comprises an inner conductor 21 made of wires which are cross-woven (alternately over and under), for example, singly, by pairs, three at a time and the like, an inner insulating jacket 22 covering the inner conductor 21, an outer conductor 24, also woven as the inner conductor 21, and an outer insulating jacket 25. A point of novelty for either of the above types of cable is that electrical continuity is effectively maintained during use because the conductors thereof stretch with their respective insulating jackets.

As a matter of manufacturing, it might be noted that in fabricating the coaxial cable 10, a metal mandrel (not shown) is basically used for forming the helically wound inner conductor 11 thereon, which metal mandrel is withdrawn after the coaxial cable is assembled. The woven type coaxial cable 20 of FIG. 2 is also fabricated in the same manner.

As a result of the rigid mathematical analysis relative to coaxial cables having either helical conductors 11, 14, as represented in FIG. 1, or woven conductors 21, 24, as represented in FIG. 2, new and novel formulae were established for determining an invariant capacitance during elongation and retraction, and the equation relating to an extensible elastic coaxial cable having woven conductors is stated as follows:

$$C_W = 151 W (\beta+1) \delta_W \frac{-\log\left(W\frac{h_1}{d}\right)}{\log\frac{r_3}{r_4}} \mu\mu f. \text{ per foot, relaxed}$$

where:
(1) $\beta$ is the coefficient of elongation represented as $$\frac{\text{feet elongation}}{\text{feet original length}} \quad \text{or} \quad \frac{L_n - L_0}{L_0}$$

feet original length (2) $\delta_W$ is a factor introduced to correct for any inequalities between $h_1$, the perpendicular distance between adjacent parallel conducting wires for the outer conductor for the cable, and $h_2$, the perpendicular distance between adjacent parallel conducting wires for the inner conductor of the cable, or, otherwise stated, $$\delta_W = 1 + .510 \log \frac{h_1}{h_2}$$

where:

$$\frac{h_1}{h_2} = \frac{e_2 P_1 r_1 \sqrt{P_{02}^2 + (2\pi r_{02})^2}}{e_1 P_2 r_2 \sqrt{P_{01}^2 + (2\pi r_{01})^2}}$$

in which:

$e_1$ is the number of wires wound in parallel in the outside conductor.
$e_2$ is the number of wires wound in parallel in the inside conductor.
$P_1$ is the pitch distance for one turn of any one wire of the outer conductor at any elongation, or, expressed otherwise, $$P_1 = P_{01}(\beta+1)$$

where:

$P_{01}$ is the pitch distance for one turn of any one wire of the outer conductor in relaxed state.
$P_2$ is the pitch distance for one turn of any one wire of the inner conductor at any elongation, or, expressed otherwise, $$P_2 = P_{02}(\beta+1)$$

where:

$P_{02}$ is the pitch distance for one turn of any one wire of the inner conductor in relaxed state.
$r_1$ is the average radius of the outer conductor in the elongation under consideration, or, expressed otherwise, $$r_1 = \frac{\sqrt{(2\pi r_{01})^2 - P_{01}^2(\beta^2 + 2\beta)}}{2\pi}$$

where:

$r_{01}$ is the average radius of the outer conductor from the axis of the helix to an imaginary cylinder occupying the median position between the inner and outer layers of the woven conductor in relaxed state, or expressed otherwise, $$r_{01} = r_{03} + (i_1 + t_1)$$

in which:

$r_{03}$ is the radius of the I.D. (without insulation) of the outer conductor in relaxed state,
$i_1$ is the thickness of the insulation on the outer conductor wires, and $t_1$ is the diameter of the outer conductor wire-bare copper.
$r_2$ is the average radius of the inner conductor in the elongation under consideration, or, expressed otherwise, $$r_2 = \frac{\sqrt{(2\pi r_{02})^2 - P_{02}^2(\beta^2 + 2\beta)}}{2\pi}$$

where:

$r_{02}$ is the average radius of the inner conductor from the axis of the helix to an imaginary cylinder occupying the median position between the inner and outer layers of the woven conductor in relaxed state, or, expressed otherwise, $$r_{02} = r_{04} - (i_2 + t_2)$$

in which:

$r_{04}$ is the radius of the O.D. (without insulation) of the inner conductor in relaxed state,
$i_2$ is the thickness of the insulation on the inner conductor wires, and $t_2$ is the diameter of the inner conductor wire-bare copper.
(3) W is a defined term expressed as $$W = \frac{.641}{(11.5 - K_2)}$$

where:

$$K_2 = \frac{\log \frac{r_3}{r_4}}{\log \frac{r_3}{r_{03}(\beta+1)^j} + \frac{1}{K} \log \frac{r_{03}(\beta+1)^j}{r_4}}$$

where:

$r_3$ is the radius of the I.D. (without insulation) of the outer conductor in the elongation under consideration, or, expressed otherwise, $$r_3 = r_1 - (i_1 + t_1)$$

$r_4$ is the radius of the O.D. (without insulation) of the inner conductor in the elongation under consideration, or, expressed otherwise, $$r_4 = r_2 + (i_2 + t_2)$$

$j$ is the exponent in Poissons' Ratio Equations representing the material forming the inner insulating jacket (always a negative number).

K is the dielectric constant of the inner insulating jacket.

(4) $h_1$ is the perpendicular distance between adjacent parallel conducting wires for the outer conductor of the cable, or, expressed otherwise, $$h_1 = \frac{2\pi P_1 r_1}{e_1 \sqrt{P_{01}^2 + (2\pi r_{01})^2}}$$

and (5) $d$ is the thickness of dielectric material between the conductors of the coaxial cable or, expressed otherwise, $$d = r_3 - r_4$$

and where the design constants to be given for each calculation are $i_1, i_2, t_1, t_2, r_{03}, r_{04}, P_{01}, P_{02}, e_1, e_2, K$ and $j$.

With the preceding at hand, the equation relating to an extensible elastic coaxial cable having helically wound conductors is now stated as follows:

$$C_H = 315 H (\beta + 1) \delta_H \frac{-\log\left(H \frac{h_1}{d}\right)}{\log \frac{r_3}{r_4}} \mu\mu f. \text{ per foot, relaxed}$$

where:

(1) $\beta$ is the coefficient of elongation represented as $$\frac{\text{feet elongation}}{\text{feet original length}} \quad \text{or} \quad \frac{L_n - L_0}{L_0}$$

(2) $\delta_H$ is a factor introduced to correct for any inequalities between $h_1$, the perpendicular distance between adjacent parallel conducting wires for the outer conductor for the cable, and $h_2$, the perpendicular distance between adjacent parallel conducting wires for the inner conductor of the cable, or, otherwise stated, $$\delta H = 1 + .330 \log \frac{h_1}{h_2}$$

where:

$$\frac{h_1}{h_2} = \frac{e_2 P_1 r_1 \sqrt{P_{02}^2 + (2\pi r_0^2)^2}}{e_1 P_2 r^2 \sqrt{P_{01}^2 + (2\pi r_{01})^2}}$$

in which:

$e_1$ is the number of wires wound in parallel in the outside conductor.

$e_2$ is the number of wires wound in parallel in the inside conductor.

$P_1$ is the pitch distance for one turn of any one wire of the outer conductor at any elongation, or, expressed otherwise, $$P_1 = P_{01}(\beta + 1)$$

where:

$P_{01}$ is the pitch distance for one turn of any one wire of the outer conductor in relaxed state.

$P_2$ is the pitch distance for one turn of any one wire of the inner conductor at any elongation, or, expressed otherwise, $$P_2 = P_{02}(\beta + 1)$$

where:

$P_{02}$ is the pitch distance for one turn of any one wire of the inner conductor in relaxed state.

$r_1$ is the average radius of the outer conductor in the elongation under consideration, or, expressed otherwise, $$r_1 = \frac{\sqrt{(2\pi r_{01})^2 - P_{01}^2 (\beta^2 + 2\beta)}}{2\pi}$$

where:

$r_{01}$ is the average radius of the outer conductor from the axis of the helix to the axis of the conductor wire in relaxed state, or expressed otherwise, $$r_{01} = r_{03} + \frac{t_1}{2}$$

in which:

$r_{03}$ is the radius of the I.D. (without insulation) of the outer conductor in relaxed state, $t_1$ is the diameter of the outer conductor wire-bare copper.

$r_2$ is the average radius of the inner conductor in the elongation under consideration, or, expressed otherwise, $$r_2 = \frac{\sqrt{(2\pi r_{02})^2 - P_{02}^2 (\beta_2 + 2\beta)}}{2\pi}$$

where:

$r_{02}$ is the average radius of the inner conductor from the axis of the helix to the axis of the conductor wire in relaxed state, or, expressed otherwise, $$r_{02} = r_{04} - \frac{t_2}{2}$$

in which:

$r_{04}$ is the radius of the O.D. (without insulation) of the inner conductor in relaxed state, and $t_2$ is the diameter of the inner conductor wire-bare copper.

(3) $H$ is a defined term expressed as $$H = \frac{.32}{(12.4 - K_2)}$$

where:

$$K_2 = \frac{\log \frac{r_3}{r_4}}{\log \frac{r_3}{r_{03}(\beta+1)^j} + \frac{1}{K} \log \frac{r_{03}(\beta+1)^j}{r_4}}$$

where:

$r_3$ is the radius of the I.D. of the outer conductor in the elongation under consideration, or, expressed otherwise, $$r_3 = r_1 - \frac{t_1}{2}$$

$r_4$ is the radius of the O.D. (without insulation) of the inner conductor in the elongation under consideration, or, expressed otherwise, $$r_4 = r_2 + \frac{t_2}{2}$$

$j$ is the exponent in Poissons' Ratio Equations representing the material forming the inner insulating jacket (always a negative number).

K is the dielectric constant of the inner insulating jacket.

(4) $h_1$ is the perpendicular distance between adjacent parallel conducting wires for the outer conductor of the cable, or, expressed otherwise, $$h_1 = \frac{2\pi P_1 r_1}{e_1 \sqrt{P_{01}^2 + (2\pi r_{01})^2}}$$

and:

(5) $d$ is the thickness of dielectric material between the conductors of the coaxial cable or, expressed otherwise $$d = r_3 - r_4$$

and where the design constants to be given for each calculation are $t_1, t_2, r_{03}, r_{04}, P_{01}, P_{02}, e_1, e_2$, From the preceding equation, it is now possible to predict cable capacitance and the variations of capacitance with $\beta$, the coefficient of elongation, for a coaxial cable having helical conductors and, hence, to determine whether the capacity hereof will be invariant during any given range of elongation $\beta$. The reliability of the equation set forth hereabove should be apparent from FIG. 3 where a curve 30, calculated from the formula, shows capacitance, in $\mu\mu f.$ per foot of relaxed length, plotted against elongation $\beta$, while curves 31 and 33 of FIG. 3 are respectively the upper and the lower examples of curves taken on twenty samples of cable, with curve 32 being the one curve of the twenty coming closest to being average.

In typically using the preceding equations in designing a new extensible elastic coaxial cable having either helical conductors or woven conductors, a series of curve sheets are developed through computations, each of which show families of curves plotting the capacitance variations for chosen variations of mechanical dimensions in the region in which the new cable is presumed to be. The curve, and hence, the particular mechanical design represented thereby, is then selected whose plot represents the desired cable performance. In other words, if it is desired to have an extensible elastic cable with an invariant capacitance for any particular range of elongation, the user would merely determine which cable type, as represented by the curves, satisfies the requirements. The actual calculating operations under the instant equations may be simplified, of course, to a great degree by the use of modern computing machines.

Therefore, it should be apparent from the preceding that the applicant has provided new and novel equations for determining the performance characteristics of an extensible elastic coaxial cable having either helically wound conductors or woven conductors. The developed equations represent effective utility and simplify the choosing of a cable for certain performance characteristics through computations rather than from the hit-and-miss approach which would otherwise have to be taken.

In addition, the cables discussed hereabove are each representative of new and novel structure in that, as designed, the conductors thereof stretch with the insulating jackets and, hence, provide features particularly important to certain modern technical uses. Moreover, while these cables have been discussed to some degree in specific terms as, for example, where each cable has but two conductors in each cable, and, hence, the above description should be considered illustrative and not as limiting the scope of the following claims.

I claim:

1. In an extensible elastic coaxial cable having a woven inner conductor, an inner insulating jacket covering said inner conductor, a woven outer conductor, and an outer insulating jacket covering said outer conductor, a relationship defining the capacitance of said cable and the variation of said capacitance with the coefficient of elongation expressed as $$C_W = 151 W (\beta+1) \delta_W \frac{-\log\left(W \frac{h_1}{d}\right)}{\log \frac{r_3}{r_4}} \mu\mu f. \text{ per foot, relaxed}$$

where:

(1) $\beta$ is the coefficient of elongation represented as $$\frac{\text{feet elongation}}{\text{feet original length}} \quad \text{or} \quad \frac{L_n - L_0}{L_0}$$

(2) $\delta_W$ is a factor introduced to correct for any inequalities between $h_1$, the perpendicular distance between adjacent parallel conducting wires for the outer conductor for the cable, and, $h_2$, the perpendicular distance between adjacent parallel conducting wires for the inner conductor of the cable, stated as $$\delta_W = 1 + .510 \log \frac{h_1}{h_2}$$

where:

$$\frac{h_1}{h_2} = \frac{e_2 P_1 r_1 \sqrt{P_{02}^2 + (2\pi r_{01})^2}}{e_1 P_2 r_2 \sqrt{P_{01}^2 + (2\pi r_{01})^2}}$$

in which:

$e_1$ is the number of wires wound in parallel in the outer conductor.

$e_2$ is the number of wires wound in parallel in the inner conductor.

$P_1$ is the pitch distance for one turn of any one wire of the outer conductor at any elongation, stated as $$P_1 = P_{01}(\beta+1)$$

where:

$P_{01}$ is the pitch distance for one turn of any one wire of the outer conductor in relaxed state.

$P_2$ is the pitch distance for one turn of any one wire of the inner conductor at any elongation, stated as $$P_2 = P_{02}(\beta+1)$$

where:

$P_{02}$ is the pitch distance for one turn of any one wire of the inner conductor in relaxed state.

$r_1$ is the average radius of the outer conductor in the elongation under consideration, stated as $$r_1 = \frac{\sqrt{(2\pi r_{01})^2 - P_{01}^2(\beta^2+2\beta)}}{2\pi}$$

where:

$r_{01}$ is the average radius of the outer conductor from the axis of the helix to an imaginary cylinder occupying the median position between the inner and outer layers of the woven conductor in relaxed state, stated as $$r_{01} = r_{03} + (i_1 + t_1)$$

in which:

$r_{03}$ is the radius of the I.D. (without insulation) of the outer conductor in relaxed state.

$i_1$ is the thickness of the insulation on the outer conductor wires, and $t_1$ is the diameter of the outer conductor wire-bare copper.

$r_2$ is the average radius of the inner conductor in the elongation under consideration, stated as $$r_2 = \frac{\sqrt{(2\pi r_{02})^2 - P_{02}^2(\beta^2+2\beta)}}{2\pi}$$

where:

$r_{02}$ is the average radius of the inner conductor from the axis of the helix to an imaginary cylinder occupying the median position between the inner and outer layers of the woven conductor in relaxed state, stated as $$r_{02} = r_{04} - (i_2 + t_2)$$

in which:

$r_{04}$ is the radius of the O.D. (without insulation) of the inner conductor in relaxed state, $i_2$ is the thickness of the insulation on the inner conductor wires, and:

$t_2$ is the diameter of the inner conductor wire-bare copper.

(3) $W$ is a defined term expressed as $$W = \frac{.641}{(11.5 - K_2)}$$

where:

$$K_2 = \frac{\log \frac{r_3}{r_4}}{\log \frac{r_3}{r_{03}(\beta+1)^j} + \frac{1}{K} \log \frac{r_{03}(\beta+1)^j}{r_4}}$$

where:

$r_3$ is the radius of the I.D. (without insulation) of the outer conductor in the elongation under consideration, stated as $$r_3 = r_1 - (i_1 + t_1)$$

$r_4$ is the radius of the O.D. (without insulation) of the inner conductor in the elongation under consideration, stated as $$r_4 = r_2 + (i_2 + t_2)$$

$j$ is the exponent in Poissons' Ratio Equations representing the material forming the inner insulating jacket (always a negative number).

K is the dielectric constant of the inner insulating jacket (4) $h_1$ is the perpendicular distance between adjacent parallel conducting wires for the outer conductor of the cable, stated as $$h_1 = \frac{2\pi P_1 r_1}{e_1 \sqrt{P_{01}^2 + (2\pi r_{01})^2}}$$

and:

(5) $d$ is the thickness of dielectric material between the conductors of the coaxial cable, stated as $$d = r_3 - r_4$$

and where the design constants to be given for each calculation are $i_1$, $i_2$, $t_2$, $r_{03}$, $r_{04}$, $P_{01}$, $P_{02}$, $e_1$, $e_2$, K and $j$.

2. In an extensible elastic coaxial cable having a helically wound inner conductor, an inner insulating jacket covering said inner conductor, a helically wound outer conductor, and an outer insulating jacket covering said outer conductor, a relationship defining the capacitance of said cable and the variation of said capacitance with the coefficient of elongation expressed as $$C_H = 315 H(\beta+1)\delta_H \frac{-\log\left(H\frac{h_1}{d}\right)}{\log \frac{r_3}{r_4}} \; \mu\mu f. \text{ per foot, relaxed}$$

where:

(1) $\beta$ is the coefficient of elongation represented as $$\frac{\text{feet elongation}}{\text{feet original length}} \quad \text{or} \quad \frac{L_n - L_0}{L_0}$$

(2) $\delta_H$ is a factor introduced to correct for any inequalities between $h_1$, the perpendicular distance between adjacent parallel conducting wires for the outer conductor for the cable, and $h_2$, the perpendicular distance between adjacent parallel conducting wires for the inner conductor of the cable, stated as $$\delta_H = 1 + .330 \log \frac{h_1}{h_2}$$

where:

$$\frac{h_1}{h_2} = \frac{e_2 P_1 r_1 \sqrt{P_{02}^2 + (2\pi r_{02})^2}}{e_1 P_2 r_2 \sqrt{P_{01}^2 + (2\pi r_{01})^2}}$$

in which:

$e_1$ is the number of wires wound in parallel in the outer conductor.

$e_2$ is the number of wires wound in parallel in the inside conductor.

$P_1$ is the pitch distance for one turn of any one wire of the outer conductor at any elongation, stated as $$P_1 = P_{01}(\beta+1)$$

where:

$P_{01}$ is the pitch distance for one turn of any one wire of the outer conductor in relaxed state.

$P_2$ is the pitch distance for one turn of any one wire of the inner conductor at any elongation, stated as $$P_2 = P_{02}(\beta+1)$$

where:

$P_{02}$ is the pitch distance for one turn of any one wire of the inner conductor in relaxed state.

$r_1$ is the average radius of the outer conductor in the elongation under consideration, stated as $$r_1 = \frac{\sqrt{(2\pi r_{01})^2 - P_{01}^2(\beta^2 + 2\beta)}}{2\pi}$$

where:

$r_{01}$ is the average radius of the outer conductor from the axis of the helix to the axis of the conductor wire in relaxed state, stated as $$r_{01} = r_{03} + \frac{t_1}{2}$$

in which:

$r_{03}$ is the radius of the I.D. (without insulation) of the outer conductor in relaxed state, and $t_1$ is the diameter of the outer conductor wire-bare copper.

$r_2$ is the average radius of the inner conductor in the elongation under consideration, stated as $$r_2 = \frac{\sqrt{(2\pi r_{02})^2 - P_{02}^2(\beta^2 + 2\beta)}}{2\pi}$$

where:

$r_{02}$ is the average radius of the inner conductor from the axis of the helix to the axis of the conductor wire in relaxed state, stated as $$r_{02} = r_{04} - \frac{t_2}{2}$$

in which:

$r_{04}$ is the radius of the O.D. (without insulation) of the inner conductor in relaxed state, and $t_2$ is the diameter of the inner conductor wire-bare copper.

(3) H is a defined term expressed as $$H = \frac{.32}{(12.4 - K_2)}$$

where:

$$K_2 = \frac{\log \frac{r_3}{r_4}}{\log \frac{r_3}{r_{03}(\beta+1)^j} + \frac{1}{K} \log \frac{r_{03}(\beta+1)^j}{r_4}}$$

$r_3$ is the radius of the I.D. of the outer conductor in the elongation under consideration, stated as $$r_3 = r_1 - \frac{t_1}{2}$$

$r_4$ is the radius of the O.D. (without insulation) of the inner conductor in the elongation under consideration, $$r_4 = r_2 + \frac{t_2}{2}$$

$j$ is the exponent in Poissons' Ratio Equations representing the material forming the inner insulating jacket (always a negative number).

K is the dielectric constant of the inner insulating jacket.

(4) $h_1$ is the perpendicular distance between adjacent parallel conducting wires for the outer conductor of the cable, stated as $$h_1 = \frac{2\pi P_1 r_1}{e_1 \sqrt{P_{01}^2 + (2\pi r_{01})^2}}$$

and, (5) $d$ is the thickness of dielectirc material between the conductors of the coaxial cable, stated as $$d = r_3 - r_4$$

and where the design constants to be given for each calculation are $t_1$, $t_2$, $r_{03}$, $r_{04}$, $P_{01}$, $P_{02}$, $e_1$, $e_2$, $k$ and $j$.

3. An elastic coaxial cable comprising: a long and slender inner tubular extensible insulating jacket having a vacant chamber therein; an extensible woven inner conductor covered by said inner jacket and disposed within said chamber and having a plurality of cross-woven parallel wires; an extensible woven outer conductor disposed on the outer surface of said jacket and having a plurality of cross-woven parallel wires; and an extensible long and slender outer insulating jacket disposed around said outer conductor, said jackets and said conductors being coaxial about a central axis, the capacitance of said cable and the variation of capacitance with coefficient of elongation being determined by the formula:

$$C_W = 151 W (\beta+1) \delta_W \frac{-\log\left(W \frac{h_1}{d}\right)}{\log \frac{r_3}{r_4}} \mu\mu f. \text{ per foot, relaxed}$$

where:

(1) $\beta$ is the coefficient of elongation represented as $$\frac{\text{feet elongation}}{\text{feet original length}} \quad \text{or} \quad \frac{L_n - L_0}{L_0}$$

(2) $\delta_W$ is a factor introduced to correct for any inequalities between $h_1$, the perpendicular distance between adjacent parallel conducting wires for the outer conductor for the cable, and $h_2$, the perpendicular distance between adjacent parallel conducting wires for the inner conductor of the cable, stated as $$\delta_W = 1 + .510 \log \frac{h_1}{h_2}$$

where:

$$\frac{h_1}{h_2} = \frac{e_2 P_1 r_1 \sqrt{P_{02}^2 + (2\pi r_{02})^2}}{e_1 P_2 r_2 \sqrt{P_{01}^2 + (2\pi r_{01})^2}}$$

in which:

$e_1$ is the number of wires wound in parallel in the outer conductor.

$e_2$ is the number of wires wound in parallel in the inner conductor.

$P_1$ is the pitch distance for one turn of any one wire of the outer conductor at any elongation, stated as $$P_1 = P_{01}(\beta+1)$$

where:

$P_{01}$ is the pitch distance for one turn of any one wire of the outer conductor in relaxed state.

$P_2$ is the pitch distance for one turn of any one wire of the inner conductor at any elongation, stated as $$P_2 = P_{02}(\beta+1)$$

where:

$P_{02}$ is the pitch distance for one turn of any one wire of the inner conductor in relaxed state.

$r_1$ is the average radius of the outer conductor in the elongation under consideration, stated as $$r_1 = \frac{\sqrt{(2\pi r_{01})^2 - P_{01}^2(\beta^2 + 2\beta)}}{2\pi}$$

where:

$r_{01}$ is the average radius of the outer conductor from the central axis to an imaginary cylinder occupying the median position between the inner and outer layers of the woven conductor in relaxed state, stated as $$r_{01} = r_{03} + (i_1 + t_1)$$

in which:

$r_{03}$ is the radius of the I.D. (without insulation) of the outer conductor in relaxed state, $i_1$ is the thickness of the insulation on the outer conductor wires, and $t_1$ is the diameter of the outer conductor wire-bare copper.

$r_2$ is the average radius of the inner conductor in the elongation under consideration, stated as $$r_2 = \frac{\sqrt{(2\pi r_{02})^2 - P_{02}^2(\beta^2 + 2\beta)}}{2\pi}$$

where:

$r_{02}$ is the average radius of the inner conductor from the central axis to an imaginary cylinder occupying the median position between the inner and outer layers of the woven conductors in relaxed state, stated as $$r_{02} = r_{04} - (i_2 + t_2)$$

in which:

$r_{04}$ is the radius of the O.D. (without insulation) of the inner conductor in relaxed state, $i_2$ is the thickness of the insulation on the inner conductor wires, and $t_2$ is the diameter of the inner conductor wire-bare copper.

(3) $W$ is a defined term expressed as $$W = \frac{.641}{(11.5 - K_2)}$$

where:

$$K_2 = \frac{\log \frac{r_3}{r_4}}{\log \frac{r_3}{r_{03}(\beta+1)^j} + \frac{1}{K} \log \frac{r_{03}(\beta+1)^j}{r_4}}$$

where:

$r_3$ is the radius of the I.D. (without insulation) of the outer conductor in the elongation under consideration, $$r_3 = r_1 + (i_1 - t_1)$$

$r_4$ is the radius of the O.D. (without insulation) of the inner conductor in the elongation under consideration, stated as, $$r_4 = r_2 + (i_2 + t_2)$$

$j$ is the exponent in Poissons' Ratio Equations representing the material forming the inner insulating jacket (always a negative number).

$K$ is the dielectric constant of the inner insulating jacket (4) $h_1$ is the perpendicular distance between adjacent parallel conducting wires for the outer conductor of the cable, stated as $$h_1 = \frac{2\pi P_1 r_1}{e_1 \sqrt{P_{01}^2 + (2\pi r_{02})^2}}$$

and:

(5) $d$ is the thickness of dielectric material between the conductors of the coaxial cable, stated as $$d = r_3 = r_4$$

and where the design constants to be given for each calculation are $i_1$, $i_2$, $t_1$, $t_2$, $r_{03}$, $r_{04}$, $P_{01}$, $P_{02}$, $e_1$, $e_2$, $K$ and $j$.

4. An elastic coaxial cable comprising: a long and slender inner tubular extensible insulating jacket having a vacant chamber therein; an extensible helically wound inner conductor having a plurality of parallel wires disposed within said chamber, said conductor being covered by said inner jacket; an extensible helically wound outer conductor having a plurality of parallel wires disposed on the outer surface of said inner jacket; and a long and slender extensible outer insulating jacket disposed around said outer conductor, the axis of the helix of each of said conductors being common with the axis of each of said jackets whereby said jackets and conductors are coaxial, the capacitance of said cable and the variation of capacitance with the elongation thereof being expressed according to the formula:

$$C_H = 315 H (\beta+1) \delta_H \frac{-\log\left(H\frac{h_1}{d}\right)}{\log \frac{r_3}{r_4}} \mu\mu f. \text{ per foot, relaxed}$$

where:

(1) $\beta$ is the coefficient of elongation represented as $$\frac{\text{feet elongation}}{\text{feet original length}} \quad \text{or} \quad \frac{L_n - L_0}{L_0}$$

(2) $\delta_H$ is a factor introduced to correct for any inequalities between $h_1$, the perpendicular distance between adjacent parallel conducting wires for the outer conductor for the cable, and $h_2$, the perpendicular disance between adjacent parallel conducting wires for the inner conductor of the cable, stated as $$\delta_H = 1 + .330 \log \frac{h_1}{h_2}$$

where:

$$\frac{h_1}{h_2} = \frac{e_2 P_1 r_1 \sqrt{P_{02}^2 + (2\pi r_{02})^2}}{e_1 P_2 r_2 \sqrt{P_{01}^2 + (2\pi r_{01})^2}}$$

in which:

$e_1$ is the number of wires wound in parallel in the outer conductor.
$e_2$ is the number of wires wound in parallel in the inside conductor.
$P_1$ is the pitch distance for one turn of any one wire of the outer conductor at any elongation, stated as $$P_1 = P_{01}(\beta + 1)$$

where:

$P_{01}$ is the pitch distance for one turn of any one wire of the outer conductor in relaxed state.
$P_2$ is the pitch distance for one turn of any one wire of the inner conductor at any elongation, stated as $$P_2 = P_{02}(\beta + 1)$$

where:

$P_{02}$ is the pitch distance for one turn of any one wire of the inner conductor in relaxed state.
$r_1$ is the average radius of the outer conductor in the elongation under consideration, stated as $$r_1 = \frac{\sqrt{(2\pi r_{01})^2 - P_{01}^2(\beta^2 + 2\beta)}}{2\pi}$$

where:

$r_{01}$ is the aveaage radius of the outer conductor from the axis of the helix to the axis of the conductor wire in relaxed state, stated as $$r_{01} = r_{03} + \frac{t_1}{2}$$

in which:

$r_{03}$ is the radius of the I.D. (without insulation) of the outer conductor in relaxed state, and $t_1$ is the diameter of the outer conductor wire-bare copper.
$r_2$ is the average radius of the inner conductor in the elongation under consideration, stated as $$r_2 = \frac{\sqrt{(2\pi r_{02})^2 - P_{02}^2(\beta^2 + 2\beta)}}{2\pi}$$

where:

$r_{02}$ is the average radius of the inner conductor from the axis of the helix to the axis of the conductor wire in relaxed state, stated as $$r_{02} = r_{04} - \frac{t_2}{2}$$

in which:

$r_{04}$ is the radius of the O.D. (without insulation) of the inner conductor in relaxed state, and $t_2$ is the diameter of the inner conductor wire-bare copper.

(3) H is a defined term expressed as $$H = \frac{.32}{(12.4 - K_2)}$$

where:

$$K_2 = \frac{\log \frac{r_3}{r_4}}{\log \frac{r_3}{r_{03}(\beta+1)^j} + \frac{1}{K} \log \frac{r_{03}(\beta+1)^j}{r_4}}$$

where:

$r_3$ is the radius of the I.D. of the outer conductor in the elongation under consideration, stated as $$r_3 = r_1 - \frac{t_1}{2}$$

$r_4$ is the radius of the O.D. (without insulation) of the inner conductor in the elongation under consideration, $$r_4 = r_2 + \frac{t_2}{2}$$

$j$ is the exponent in Poissons' Ratio Equations representing the material forming the inner insulating jacket (always a negative number).
K is the dielectric constant of the inner insulating jacket.

(4) $h_1$ is the perpendicular distance between adjacent parallel conducting wires for the outer conductor of the cable, stated as $$h_1 = \frac{2\pi P_1 r_1}{e_1 \sqrt{P_{01}^2 + (2\pi r_{01})^2}}$$

and:

(5) $d$ is the thickness of dielectric material between the conductors of the coaxial cable, stated as $$d = r_3 - r_4$$

and where the design constants to be given for each calculation are $t_1$, $t_2$, $r_{03}$, $r_{04}$, $P_{01}$, $P_{02}$, $e_1$, $e_2$, $k$ and $j$.

References Cited by the Examiner

UNITED STATES PATENTS

| 2,939,905 | 6/1960 | Canfield | 174—69 |
| 3,100,240 | 8/1963 | McKirdy | 174—69 |

FOREIGN PATENTS

| 750,824 | 6/1933 | France. |
| 976,516 | 10/1950 | France. |
| 355,716 | 1/1938 | Italy. |

OTHER REFERENCES

"Stretchable Cable," in Electronic Design, March 15, 1957, pages 28 and 29, 174–69.

Engineering Fact Sheet, Elasticable, United Cable Division, Mutual Electronic Industries Corp., 174–69.

HERMAN KARL SAALBACH, *Primary Examiner.*

L. ALLAHUT, *Assistant Examiner.*